(12) United States Patent
Hong et al.

(10) Patent No.: US 10,477,093 B2
(45) Date of Patent: Nov. 12, 2019

(54) METHOD FOR CAPTURING IMAGE AND IMAGE CAPTURING APPARATUS FOR CAPTURING STILL IMAGES OF AN OBJECT AT A DESIRED TIME POINT

(71) Applicant: SAMSUNG ELECTRONICS CO., LTD., Suwon-si (KR)

(72) Inventors: Hyun-seok Hong, Suwon-si (KR); Hee-chul Han, Hwaseong-si (KR); Kyoung-young Kim, Suwon-si (KR); Sahng-gyu Park, Seongnam-si (KR); Jin-gu Jeong, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 220 days.

(21) Appl. No.: 14/826,579

(22) Filed: Aug. 14, 2015

(65) Prior Publication Data

US 2016/0080633 A1 Mar. 17, 2016

(30) Foreign Application Priority Data

Sep. 15, 2014 (KR) ........................ 10-2014-0122251

(51) Int. Cl.
*H04N 5/232* (2006.01)
*G06K 9/00* (2006.01)
(Continued)

(52) U.S. Cl.
CPC ..... *H04N 5/23212* (2013.01); *G06K 9/00342* (2013.01); *G06K 9/2081* (2013.01);
(Continued)

(58) Field of Classification Search
CPC ............ G06K 9/00342; G06K 9/2081; G06K 9/3233; H04N 5/23212; H04N 5/23219; H04N 5/23222; H04N 5/23293
See application file for complete search history.

(56) References Cited

U.S. PATENT DOCUMENTS 7,046,292 B2   5/2006   Ziemkowski
7,489,806 B2   2/2009   Mohri et al.
(Continued)

FOREIGN PATENT DOCUMENTS

CN   1711516 A    12/2005
CN   103119611 A   5/2013
(Continued)

OTHER PUBLICATIONS

Search Report dated Nov. 27, 2015, issued by the International Searching Authority in counterpart International Patent Application No. PCT/KR2015/007629 (PCT/ISA/210).
(Continued)

*Primary Examiner* — Francis Geroleo
(74) *Attorney, Agent, or Firm* — Sughrue Mion, PLLC

(57) ABSTRACT

Image capturing methods and image capturing apparatuses are provided. The image capturing method may include setting a target position of a live view image, tacking a moving object from the live view image, estimating a position of the moving object by using information on the tracked moving object, and capturing a still image based on the estimated position when the moving object is positioned on the target position of the live view image.

26 Claims, 22 Drawing Sheets

(51) Int. Cl.
  *G06K 9/20* (2006.01)
  *G06T 7/20* (2017.01)
  *G06K 9/32* (2006.01)

(52) U.S. Cl.
  CPC ....... *G06K 9/3233* (2013.01); *H04N 5/23219* (2013.01); *H04N 5/23222* (2013.01); *H04N 5/23293* (2013.01)

(56) References Cited

U.S. PATENT DOCUMENTS

| | | | |
|---|---|---|---|
| 8,416,306 B2 | 4/2013 | Yun et al. | |
| 8,749,687 B2 | 6/2014 | Kang | |
| 8,780,200 B2 | 7/2014 | Yamamoto | |
| 8,913,176 B2 | 12/2014 | Chun et al. | |
| 9,215,426 B2 | 12/2015 | Kim et al. | |
| 2003/0133018 A1 | 7/2003 | Ziemkowski | |
| 2005/0232467 A1 | 10/2005 | Mohri et al. | |
| 2008/0192116 A1 | 8/2008 | Tamir et al. | |
| 2008/0239104 A1 | 10/2008 | Koh | |
| 2010/0062803 A1 | 3/2010 | Yun et al. | |
| 2011/0128397 A1 | 6/2011 | Kang | |
| 2011/0267530 A1 | 11/2011 | Chun | |
| 2012/0120277 A1 | 5/2012 | Tsai | |
| 2012/0262590 A1 | 10/2012 | Yumiki | |
| 2013/0170697 A1* | 7/2013 | Zises | G06T 11/00 382/103 |
| 2013/0188090 A1* | 7/2013 | Saito | H04N 5/23212 348/345 |
| 2013/0258160 A1* | 10/2013 | Yoshioka | H04N 5/23293 348/333.11 |
| 2013/0329111 A1* | 12/2013 | Desai | H04N 5/23293 348/333.02 |
| 2014/0015966 A1* | 1/2014 | Kim | H04N 7/18 348/143 |
| 2015/0015702 A1 | 1/2015 | Yamaguchi et al. | |
| 2015/0029304 A1* | 1/2015 | Park | H04N 5/23238 348/36 |
| 2015/0029382 A1 | 1/2015 | Chun et al. | |
| 2015/0085173 A1 | 3/2015 | Chun et al. | |

FOREIGN PATENT DOCUMENTS

| | | |
|---|---|---|
| JP | 2974316 B1 | 11/1999 |
| JP | 3429540 B2 | 7/2003 |
| JP | 2003-241066 A | 8/2003 |
| JP | 2003-274251 A | 9/2003 |
| JP | 2005-176274 A | 6/2005 |
| JP | 2007-166564 A | 6/2007 |
| JP | 2010-41299 A | 2/2010 |
| JP | 2010-239169 A | 10/2010 |
| JP | 2011-254289 A | 12/2011 |
| JP | 2012-048476 A | 3/2012 |
| JP | 2013-117613 A | 6/2013 |
| JP | 5479636 B2 | 4/2014 |
| JP | 2014-132708 A | 7/2014 |
| KR | 10-2009-0028329 A | 3/2009 |
| KR | 10-2011-0060497 A | 6/2011 |
| KR | 10-2012-0017329 A | 2/2012 |
| KR | 10-2012-0037047 A | 4/2012 |
| KR | 10-2014-0007692 A | 1/2014 |
| WO | 2011163454 A1 | 12/2011 |
| WO | 2013/133129 A1 | 9/2013 |

OTHER PUBLICATIONS

Written Opinion dated Nov. 27, 2015, issued by the International Searching Authority in counterpart International Patent Application No. PCT/KR2015/007629 (PCT/ISA/237).
Communication dated Sep. 28, 2017, issued by the Australian Patent Office in counterpart Australian Patent Application No. 2015319023.
Communication dated Jan. 24, 2018 by IP Australia in counterpart Australian Patent Application No. 2015319023.
Communication dated Mar. 2, 2018 by the European Patent Office in counterpart European Patent Application No. 15842908.4.
Communication dated Apr. 10, 2018 by IP Australia in counterpart Australian Patent Application No. 2015319023.
Communication dated Sep. 18, 2018 issued by the European Patent Office in counterpart European Application No. 15 842 908.4.
Communication dated Jan. 7, 2019, issued by the State Intellectual Property Office of People's Republic of China in counterpart Chinese Application No. 201580047720.6.
Communication dated Sep. 16, 2019, issued by the State Intellectual Property Office of People's Republic of China in counterpart Chinese Application No. 201580047720.6.

* cited by examiner

METHOD FOR CAPTURING IMAGE AND IMAGE CAPTURING APPARATUS FOR CAPTURING STILL IMAGES OF AN OBJECT AT A DESIRED TIME POINT

CROSS-REFERENCE TO RELATED APPLICATIONS

This application claims priority from Korean Patent Application No. 10-2014-0122251, filed on Sep. 15, 2014 in the Korean Intellectual Property Office, the disclosure of which is incorporated herein by reference in its entirety.

BACKGROUND

1. Field

Apparatuses and methods consistent with exemplary embodiments relate to image capturing, and more specifically, to an image capturing apparatus configured to allow a user to easily capture still images of an object at a time point as desired by the user and an image capturing method thereof.

2. Description of the Related Art

When dynamic sporting events or fast-moving animals are photographed, a photographing technology that can quickly capture the moment is necessary. A related digital camera provides the technology in which one moment of a scene with a moving object can be quickly photographed by reading out data of an image sensor at a high speed frame rate.

However, because a minimum time is needed between the shutter release being pressed and the image data being read out from the sensor, it is difficult even for professional camera users to photograph a scene correctly that involves a fast-moving object, such as capturing a baseball at a specific point in time desired by the user (e.g., when a batter hits a baseball).

Accordingly, new technology is necessary, in which a camera user can easily capture still images of an object at the time point desired by the user.

SUMMARY

Exemplary embodiments overcome the above disadvantages and other disadvantages not described above. However, not all exemplary embodiments are required to overcome the disadvantages described above, and an exemplary embodiment concept may not necessarily overcome any of the problems described above.

Exemplary embodiments provide an image capturing apparatus and an image capturing method which allow a user to easily capture still images of an object at a time point as desired by the user.

According to an aspect of an exemplary embodiment, there is provided an image capturing method including setting a target position of a live view image, tracking a moving object from the live view image, estimating a position of the moving object by using information on the tracked moving object, and capturing a still image based on the estimated position when the moving object is positioned on the target position of the live view image.

The setting target position may include setting the target position based on a detected object after detecting a preset object from the live view image.

The setting target position may include setting the position according to a user input to be the target position.

The setting target position may include setting the target position based on the position information which is detected by an image capturing apparatus.

The image capturing method may include displaying a guide line indicating the target position.

The image capturing method may include identifying a person included in the live view image. Herein, the guide line indicating the target position may be displayed based on information corresponding to the identified person.

The identifying a person may include identifying the person by recognizing a face or number of the person included in the live view image.

The information corresponding to the identified person may be at least one of batting average or batting points of the identified person.

The setting target position may include setting the target position again by reversing the target position based on the vertical line in response to receiving a user command to reverse the target position.

The image capturing method may include displaying a guide box indicating the target position, and performing a zoom-in or a zoom-out of a lens of an image capturing apparatus to fill up the guide box with a person included in the live view image.

The size of the guide box may be adjusted according to a user input.

The estimating a position of the moving object may include estimating the position of the moving object by using at least one among an actual size of the moving object, a size of the moving object on the live view image, a displacement of the moving object relative to a previously photographed live view image, and a frame rate of an image capturing apparatus.

The image capturing method may include inserting speed information of the moving object into the captured still image, and the speed information of the moving object may be calculated with a following mathematical formula.

Speed of Moving Object (km/h)=Actual Diameter (mm) of Moving Object/Measured Diameter (pixel) of Moving Object*Position Displacement (pixel) between Image Frames*Photographing Speed of Image Frame (frame/sec)*3600/1000/1000.

The image capturing method may include calculating hitting position regarding the moving object and displaying the calculated hitting position on the screen. The hitting position may be calculated with a following mathematical formula.

Hitting position (pixel)=Speed of Moving Object (km/h) *1000*1000/3600*1/Photographing Speed of Image Frame*Height_pixel (pixel)/Height_guide_box (meter) *Minimum Taken Time (frame). Herein, Height_pixel indicates measured height of the guide box included in the live view and Height_guide_box indicates actual height of the guide box included in the live view.

The still image may be captured by adjusting a focus of an image capturing apparatus on the moving object.

The focus of the image capturing apparatus may be adjusted by providing a weight on a contrast toward the vertical direction to the moving direction of the object or on phase differential pixel values.

The image capturing method may further include displaying the tracked trajectories of the moving object on the captured still image.

The image capturing method may further include receiving information related to the still image from a server, and creating metadata of the still image based on the received information related to the still image.

The image capturing method may include determining a time necessary for the moving object to be positioned on the target position based on the estimated results, and displaying a warning message when the determined time is shorter than the shutter lag time of an image capturing apparatus.

The image capturing method may include adjusting a frame rate of an image capturing apparatus based on information regarding intervals between estimated trajectories of the tracked moving object included in the consecutive live view images.

According to an aspect of another exemplary embodiment, there is provided an image capturing apparatus including a display configured to display a live view image, a target position setter configured to set a target position of the live view image, a tracker configured to track a moving object from the live view image, an estimator configured to estimate a position of the moving object by using information on the tracked moving object, and a photographer configured to capture a still image based on the estimated position when the moving object is positioned on the target position of the live view image.

The image capturing apparatus may include a focus lens, a motor driver configured to drive the focus lens, and a controller configured to control the motor driver to adjust a focus with the focus lens. Herein, the controller may limit a focus range of the focus lens to be within a preset range in response to receiving a manual focusing input, and control the motor driver to perform an auto focusing within the preset range in response to receiving a half shutter input.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
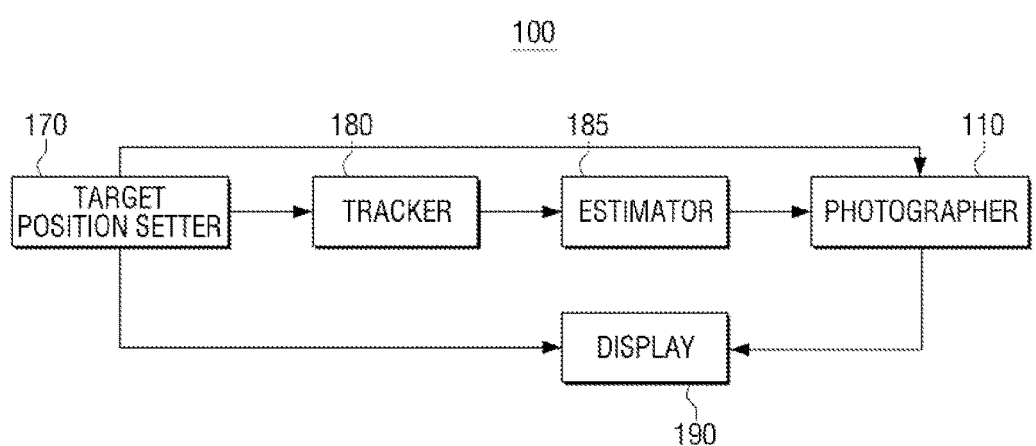
FIGS. 1 and 2 are block diagrams of an image capturing apparatus according to exemplary embodiments.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known operations or structures are not described in detail since they would obscure the description with unnecessary detail.

Figure 2:
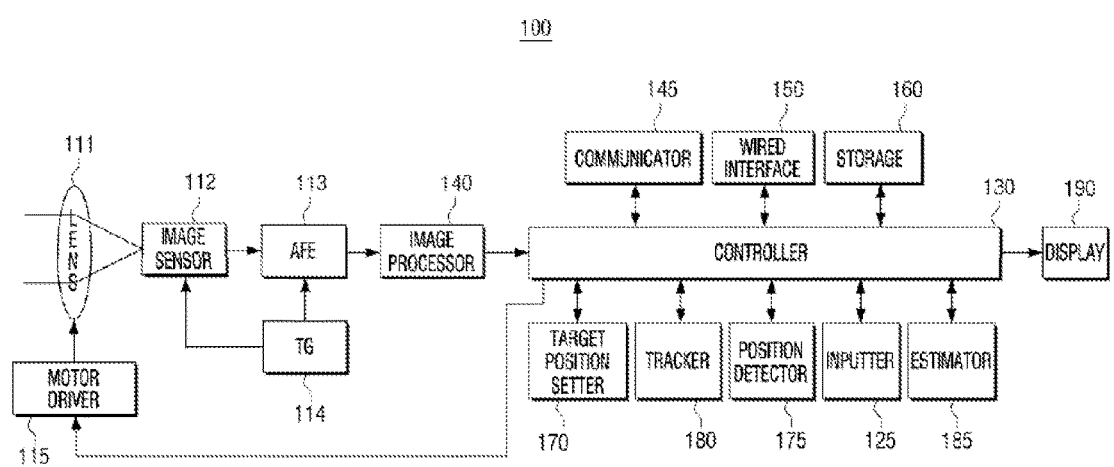

FIGS. 1 and 2 are block diagrams of an image capturing apparatus 100 according to exemplary embodiments.

Referring to FIG. 1, the image capturing apparatus 100 according to an embodiment includes a display 190, a target position setter 170, a tracker 180, an estimator 185, and a photographer (camera) 110.

The image capturing apparatus 100, 100-1, 100-2 may be various electronic devices. For example, the image capturing apparatus may be various electronic devices provided with a camera function, such as digital camera, MP3 player, portable media player (PMP), smart phone, cellular phone, smart eyeglasses, tablet personal computer (PC), or smart watch.

The display 190 is configured to display an object. Specifically, the display 190 may display live view images captured by the photographer 110 in a real-time basis. Further, the display 190 may display at least one of a user interface including characters and icons, electronic device information, a moving image and a still image. When the display 190 displays the live view images captured by the photographer 110, the display 190 may perform an electronic view finder function. The display 190 may be designed with various display panels.

For example, the display 190 may be designed with various display technologies such as organic light emitting diodes (OLED), liquid crystal display (LCD) panel, plasma display panel (PDP), vacuum fluorescent display (VFD), field emission display (FED), or electro luminescence display (ELD). The display panel may be usually implemented to be emitting type; however, reflective types of the displays such as E-ink, P-ink, or photonic crystal may also be utilized. Further, the display panel may be implemented to be a flexible display or a transparent display.

Further, the display 190 may include a touch screen. When a user performs a touch on an object displayed on the touch screen of the display 190, the touch screen may perform input and output in response to the touch by processing a signal and transmitting the processed signal to a controller 130.

The target position setter 170 is configured to set a target position of live view images. The target position refers to the position that is set for photographing a still image at a moment when a moving object is positioned on the standard portion on the live view images. The target position may be set by a user input. Further, the target position may be set based on a detected object when the target position setter 170 detects a preset object from the live view images.

Figure 3:
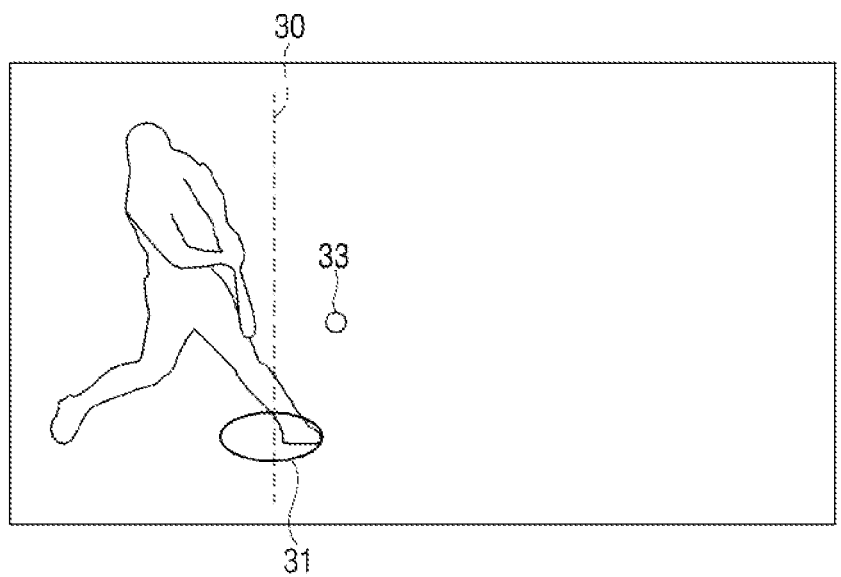
FIG. 3 illustrates a target position setting method according to an exemplary embodiment.

FIG. 3 illustrates a target position setting method according to an exemplary embodiment.

FIG. 3 illustrates an example of the target position setting in the context of capturing a moment of a baseball game when a batter hits a ball 33 thrown by a pitcher in the live view images. Herein, the target position may be position 30 at the moment when the pitched ball approaches the home plate and is then hit by the batter's bat. Such target position may be set based on the detected object, after the home plate, the runner box, and the batter are detected from the live view images. Further, the target position may be set with main batting point information of to the batter by detecting a face of the batter, a number of the batter (e.g., the number on the batter's back or on the batter's jersey), or other features of the batter. Further, bat tracking information of the batter may also be used. The target position may be set or the set target position may be adjusted according to a user input. As described above, when the display 190 of the image capturing apparatus 100 includes the touch screen (not illustrated), the target position may be set according to a user input to drag on the touch screen to adjust the target position. Although the target position setting is described in the context of a baseball hit by a batter in this exemplary embodiment, the target position may be set similarly in other exemplary embodiments for capturing the moment when an object (e.g., a person, animal, automobile, ball, etc.) arrives at a specified position.

Figure 4:
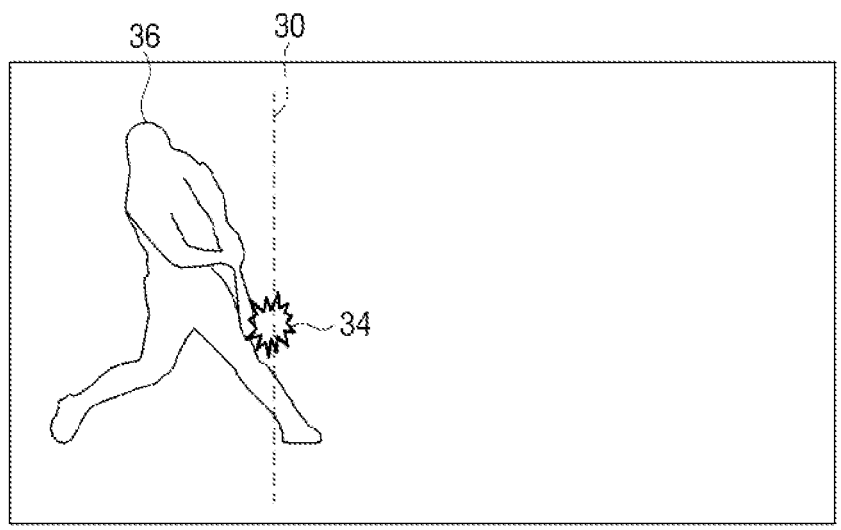
FIG. 4 illustrates a guide line according to an exemplary embodiment.

FIG. 4 illustrates a guide line according to an exemplary embodiment. The display 190 of the image capturing apparatus 100 may display a guide line 30 indicating the target position. The guide line 30 may be expressed with a straight line directly indicating the target position; however, the guide line 30 may be also expressed with a guide object 36 indicating the object related to the target position. FIG. 4 illustrates the guide object 36 guiding position and size of the batter. A user may perform photographing after setting the image capturing apparatus 100 so that the batter is arranged within the guide object 36 displayed on the live view images. Although the guide object 36 is expressed to be a batter shape according to the exemplary embodiment of FIG. 4, the guide object may be set in various shapes or forms, such as polygonal shapes. A user may manipulate the image capturing apparatus 100 through zoom in or zoom out commands so that the batter is arranged within the guide object 36 displayed on the live view images. One exemplary embodiment of the guide object will be explained below with respect to an exemplary embodiment using a guide box.

The target position setter 170 may set the target position based on the detected position information with the image capturing apparatus 100. Thus, the image capturing apparatus 100 may further include a position detector 175 as illustrated in FIG. 2, and detect geographical position information of the image capturing apparatus 100 through the position detector 175. The target position setter 170 may adjust position of the batter in the live view images by using GPS information of the image capturing apparatus 100, and adjust hitting points corresponding to the position of the batter in detail. For example, GPS information or other information may be used to determine the direction from which the images are captured, such as the location of the image capturing apparatus 100 in a baseball stadium. Compared to photographing from the side direction of the batter, hitting points may be moved further toward the back when performing the photographing from the front direction of the runner.

Further, the target position setter 170 may analyze forms of a preset object (e.g., the home plate), determine the hitting position of a batter, and finely adjust the guide line based on the determination. The display 190 may display the adjusted guide line.

The target position setter 170 may identify the batter, and the display 190 may display colors of the guide line 30 to be thicker or lighter according to the batter's batting average, which may be controlled by the controller 130 described below. The batter may be identified by recognizing the batter's jersey number and/or the batter's face or other information identifying the batter. A storage 160 of FIG. 2 may store average batting points of the runner as metadata, and the target position setter 170 may finely adjust the position of the guide line based on the metadata.

Figure 5:
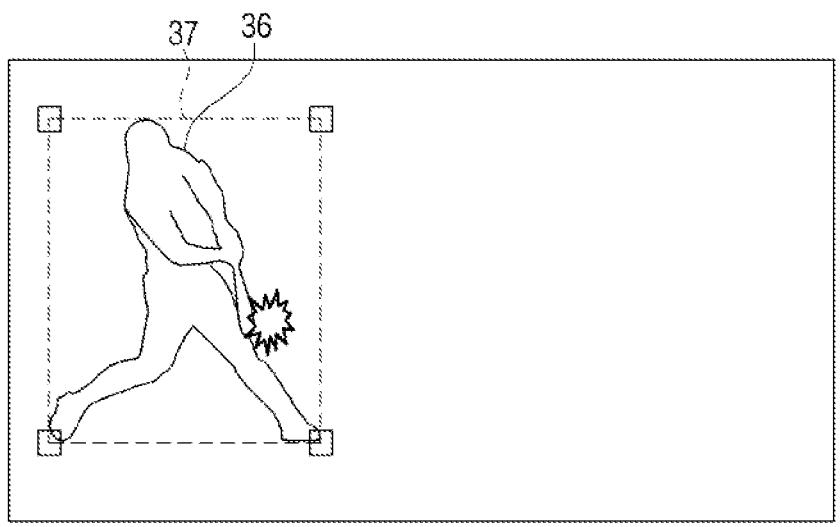
FIG. 5 illustrates a guide box according to an exemplary embodiment.

FIG. 5 illustrates the guide box according to an exemplary embodiment. As illustrated in FIG. 5, the display 190 may display a guide box 37 indicating the target position, under control of the controller 130. The guide box 37 is a guide object to adjust the zoom so that a person or other object is arranged within the guide box 37 on the live view images. When the guide box 37 is displayed, a user may adjust the size of the guide box 37 by performing a touch and drag input on a corner or a side of the guide box 37. Thus, when a touch input or a drag input is performed on a corner or a side of the guide box 37, the size of the guide box 37 may be modified in accordance with the direction of dragging. When there is no input on the guide box 37 for preset time, or when a user command is received indicating that a guide box 37 adjusting command will not be further input (e.g., receiving a touch on a center of the guide box), the photographer 110 of the image capturing apparatus 100 may adjust the zoom of the lens so that the person 36 is arranged within the guide box 37. When the final size of the guide box 37 is greater than the person 36, the photographer 110 may adjust the focal distance of the lens by zooming out so that the person 36 is arranged within the guide box 37. When the person 36 is smaller than the size of the guide box 37, the photographer 110 may adjust the focal distance of the lens by zooming in to fill up the guide box 37 with a person included in the live view image. On the final live view image, the focal distance may be set to fill up the guide box with a person included in the live view image.

Figure 6:
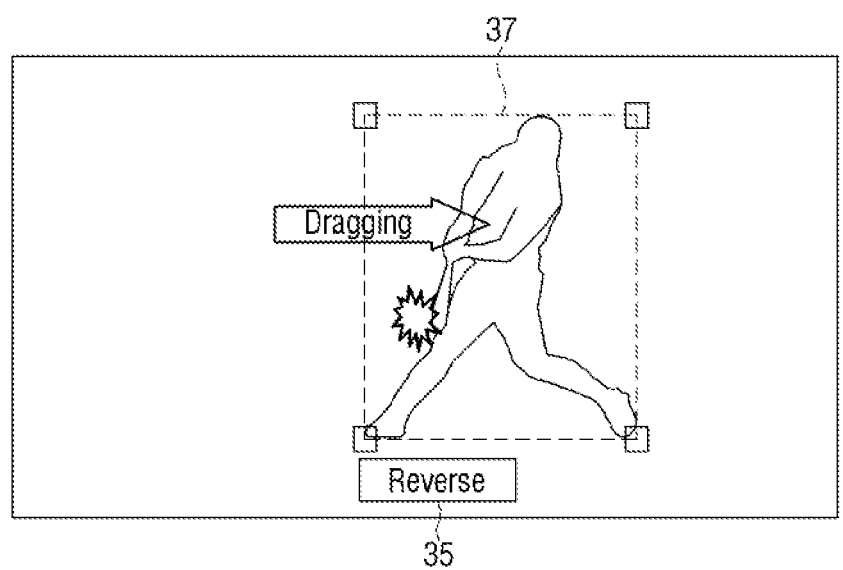
FIG. 6 illustrates a guide box according to another exemplary embodiment.

FIG. 6 illustrates the guide box according to another exemplary embodiment. The position of the guide box 37 needs to be modified according to the user's position for photographing an object. The position of the guide box 37 may be modified according to a user input or may be modified automatically. When a user command to reverse the target position is received, the target position setter 170 may set the target position again by reversing the target position based on the vertical line passing through the center of the live view images. When a user command to select a reverse item 35 is received according to the exemplary embodiment of FIG. 6, the guide box 37 may be displayed on the mirror image position by reversing the left and the right directions of the guide box 37. In this case, a user command may be executed according to a touch input or other input. The guide box 37 may be also reversed by touching and dragging one side of the guide box 37 toward the opposite direction.

Regarding the operation of the image capturing apparatus 100, the tracker 180 may track the moving object on the live view images. Specifically, the tracker 180 may detect the moving object by analyzing frames from the live view images. Detecting the object may be performed by comparing image pixels of frames of the live view images.

The estimator 185 is configured to estimate the position of the moving object by using the tracked information. The estimator 185 may estimate the speed of the moving object (virtual speed) from the live view images by using the tracked information. The virtual speed may be defined to be the speed of the object within the live view images. Thus, the virtual speed information may indicate how many pixels the object moves for a specified time on the live view images. Trajectories of the moving object may be estimated by using such information. Thus, it is possible to obtain the time taken for the object to approach the target position after the moving object first appears on the live view images. Therefore, the photographer 110 may obtain a still image at the moment when the moving object correctly approaches the target position by analyzing sensed values of the image sensor (not illustrated) after the estimated time from the first time when the moving object appears on the live view images. Thus, the still image may be captured at the desired point in time when the moving object arrives at the position in the image indicated by the target position.

Figure 7:
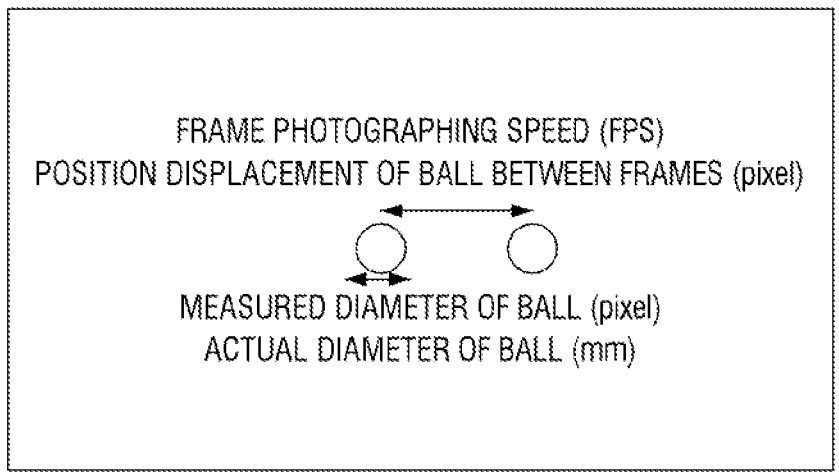
FIG. 7 illustrates information necessary for obtaining actual speed of a ball which is a moving object according to an exemplary embodiment.

The estimator 185 may calculate an actual speed of the moving object. FIG. 7 illustrates information necessary for obtaining the actual speed of a ball which is a moving object according to an exemplary embodiment.

Because the information regarding actual size and moving distance (displacement) of the moving object may be obtained from the provided values, the actual speed of the moving object may be calculated from the information regarding the detected moving object from the live view images. Thus, the actual speed of the moving object may be calculated by using the actual size information of the moving object, the size information on the live view images, and the distance (displacement) in the live view images. For example, the actual speed of the moving object may be calculated by using the following mathematical formula.

> Speed (km/h) of Moving Object=Actual Diameter (mm) of Moving Object/Measured Diameter (pixel) of Moving Object*Position Displacement (pixel) of Moving Object between Image Frames*Photographing Speed of Image Frame (frame/sec)*3600/1000/1000.

The display 190 may display the calculated actual speed of the moving object on the final generated still image. For example, when a pitcher throws a ball at a speed of 150 km/h, 150 km/h may be marked on the final generated still image.

Figure 8:
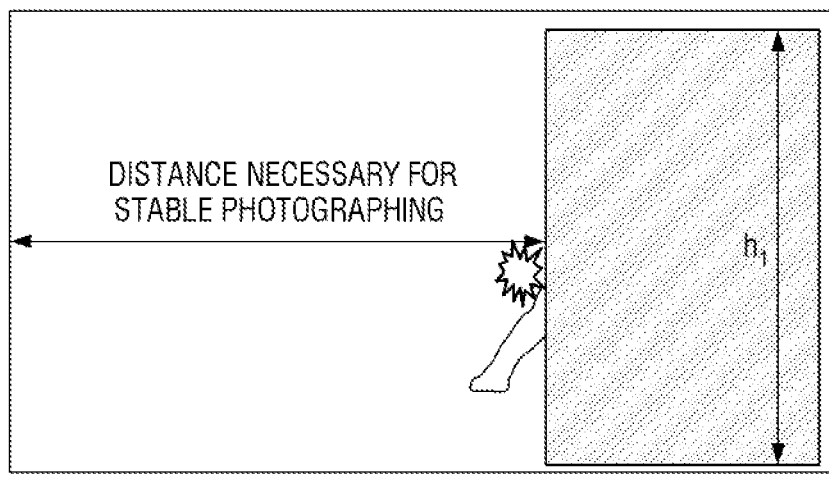
FIGS. 8A and 8B illustrate an exemplary embodiment in which hitting position is guided based on a ball speed.
Figure 8:
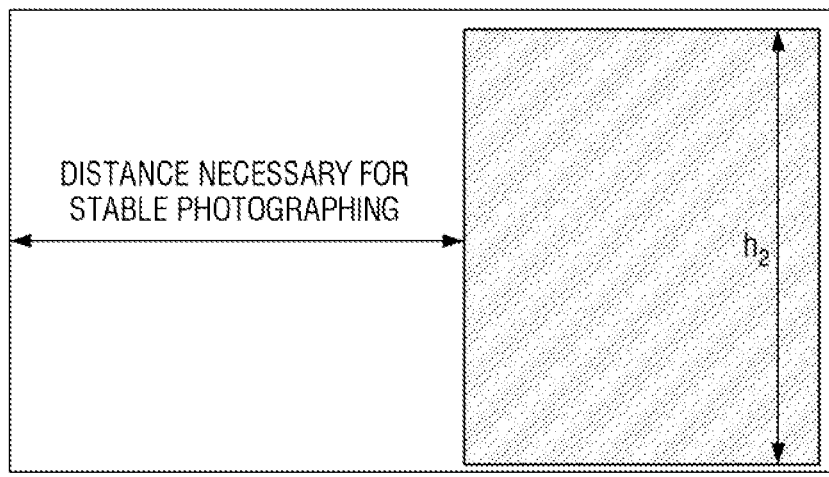

The position of the guide box 37 may be set by using the actual speed of the moving object. FIGS. 8A and 8B illustrate an exemplary embodiment in which hitting points may be guided based on the ball speed.

The estimator 185 may determine the time necessary for the moving object to be positioned on the target position based on the estimated results. When the determined time is shorter than the shutter lag time of the image capturing apparatus 100, the controller 130 may cause a warning message to be displayed. The shutter lag time information indicates information regarding the amount of time required until the readout of pixel data is performed after the shutter release is activated. The necessary time for the moving object to be positioned on the target position may be time taken from the time when the moving object is first included in the live view images (i.e., the time when a ball is first detected from the live view images) to the time when a ball approaches on the target position. When the above time is shorter than the shutter lag time information, the moving object may be first detected and a shutter signal may be immediately generated. Thus, the moving object may already pass through the target position at the time when the read out of pixel values in the image sensor is performed. In this case, a warning message may be output so that a user can adjust the size of the guide object. When the guide object is reduced, the lens may be zoomed out. Thus, the above problem may be solved because zooming out increases the time for detecting trajectories of the moving object from the uniform frame rate.

The estimator 185 may provide a guide on batting points of the runner by considering the estimated time necessary for the photographing, the time in detecting and tracking the moving object (ball), and determining the time necessary for the moving object to be positioned on the target position. When considering the maximum ball speed and the height of the batter (actual height corresponding to the guide box, i.e., size of the guide box), a warning may be displayed if the batter GUI (guide object) is out of the corresponding position range by using a relationship between the necessary time and the batting position (see FIG. 8B). Further, the proper position range may be recommended or displayed on the screen.

Although not illustrated in drawings, the image capturing apparatus 100 may further include a movement detector (not illustrated). The movement detector may detect motion of the image capturing apparatus 100, and examine whether the apparatus moves for more than preset displacement or moves with more than preset acceleration. In this case, the controller 130 may control the display 190 to display a warning message. A warning message may be displayed when the movement is determined to be excessive because shaking of the image capturing apparatus 100 may interfere with detecting the moving object.

Further, when brightness of the live view images on the image capturing apparatus 100 is below a preset value, i.e., when detecting the moving object is difficult due the brightness level of the image being too low, the controller 130 may cause a warning message to be output. Thus, a warning message may be displayed because detection of the moving object is difficult when the surroundings are dark or insufficient light is provided in the image.

The hitting position may be calculated with a following mathematical formula in the exemplary embodiment of FIGS. 8A and 8B.

> Hitting position (pixel) when a ball comes from the left=Ball Speed (km/h)*1000*1000/3600*1/FPS (sec/frame)*Height_pixel (pixel)/Height_guide_box (meter)*minimum taken time (frame).

Figure 9:
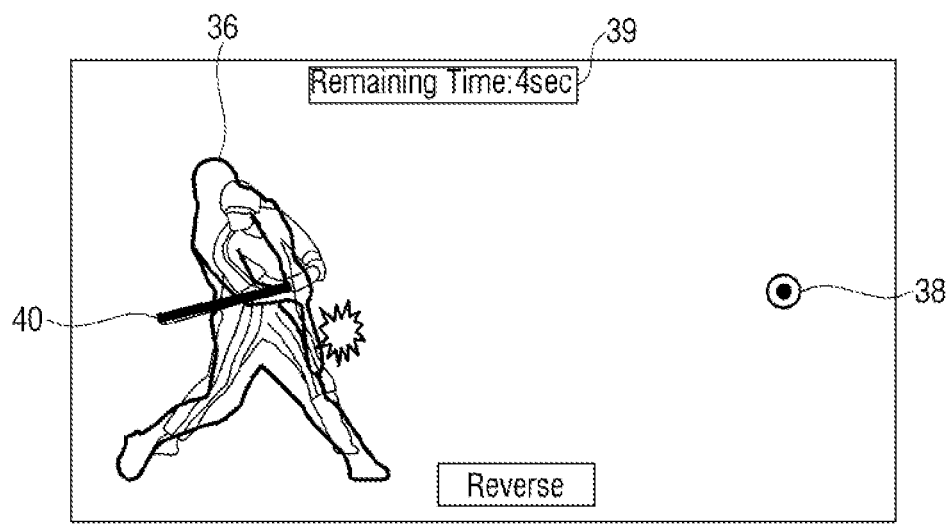
FIG. 9 illustrates a photographing standby time displayed according to an exemplary embodiment.

FIG. 9 illustrates an exemplary embodiment in which the photographing standby time is displayed.

A user may input the maximum photographing standby time to the image capturing apparatus 100. The maximum photographing standby time indicates the maximum time when the image capturing apparatus 100 can standby until a still image is captured after a user presses the shutter release and the moving object is positioned on the target position. When photographing is not performed within the maximum photographing standby time after a user inputs the maximum photographing standby time, the image capturing apparatus 100 may cancel the photographing of a corresponding still image. The image capturing apparatus 100 may return to the initial state and set the target position again, or receive the input of a maximum photographing standby time.

The display 190 may display the maximum photographing standby time on the screen. The maximum photographing standby time may be counted down and displayed on the screen as the current time remaining for the photographing standby time 39. The display 190 may display a mark 38 when the moving object appears on the screen so that the moving object can be recognized based on the estimated track information.

The tracker 180 may track a plurality of moving objects. Referring to FIG. 9, the tracker 180 may track a bat which is a moving object in addition to a ball. Herein, the display 190 may display an identifiable mark 40 on the position of the bat per estimated frame based on the bat information detected from the live view images. Likewise, a moving shape 36 may be displayed to be identifiable by tracking the moving shape of the batter.

The photographer 110 of the image capturing apparatus 100 is configured to photograph an object. When the light reflected from the object enters the lens 111 of FIG. 2, image of the object may be formed on the image sensor 112 of FIG. 2. The formed image, i.e., the optical charges accumulated on the image sensor 112 may be output as image data. Specifically, the photographer 110 may read sensed values from the image sensor 112, prepare live view images based on the sensed values, and transmit the images to the display 190.

Further, a still image may be captured when the moving object is positioned on the target position of the live view images.

Referring to FIG. 2, the exemplary embodiment of the photographer 110 of the image capturing apparatus 100 may include a lens 111, a motor driver 115, an image sensor 112, an analog front end (AFE) 113, and a timing generator (TG) 114.

The lens 111 is where the light reflected from the object enters, and includes at least one lens among the zoom lens controlling the angle of the view to be narrower or wider according to the focal distance and the focus lens adjusting the focal point of the object. The lens 111 is accepted in a lens barrel of the image capturing apparatus 100, and moved with a driving signal of the motor driver 115 to adjust the focal point. Further, the lens barrel includes the shutter and an aperture which respectively adjust the amount of the light entering the lens with a driving motor.

The image sensor 112 is unit in which an image of the object passing through the lens 111 is formed. The image sensor 112 includes a plurality of pixels arranged in a matrix format. The plurality of pixels of the image sensor 112 may be formed in a Bayer pattern. T plurality of pixels may respectively accumulate optical charges according to the incident light, and output the image formed by the optical charges as an electric signal. The image sensor 112 may be a complementary metal oxide semiconductor (CMOS) sensor; alternatively, it may be realized as charge coupled device (CCD). A plurality of the pixels according to an exemplary embodiment may include a plurality of phase differential pixels.

The image sensor 112 may include photo diode (PD), transmission transistor (TX), reset transistor (RX), and floating diffusion node (FD). The PD may generate and accumulate optical charges corresponding to the optical images of the object. The TX may transmit the generated optical charges in PD to FD in response to a transmitting signal. The RX may charge the electrical charges stored in FD in response to a reset signal. The electrical charges stored in FD may be output before the reset signal is generated. A correlated double sampling (CDS) image sensor may be provided and CDS processing may be performed. Further, the ADC may convert the analog signal performed with CDS processing into a digital signal.

AFE 113 may perform sampling and digitizing of an electrical signal of an object image that is output from the image sensor 112. AFE 113 may be controlled by the controller 130.

TG 114 may output a timing signal to read out pixel data of the image sensor 112. TG 114 may be controlled by the controller 130.

However, the photographer 110 may include other components substituting for the AFE 113 and TG 114 in other exemplary embodiments. For example, when the image sensor 112 is implemented as a CMOS type sensor, the above described units may not be necessary.

The motor driver 115 may adjust the focus by driving the focus lens under the control of the controller 130.

As illustrated in FIG. 2, the image capturing apparatus 100 may further include an image processor 140, a wired interface 150, a communicator 145, the storage 160, the position detector 175, and the controller 130.

The image processor 140 may image-process raw image data under the control of the controller 130, and record the processed image data on the storage 160. Further, the image processor 140 may deliver the image-processed data stored on the storage 160 to the display 190.

When auto-focusing is performed by using a phase difference technique, the image processor 140 may separate a signal to generate an image (a signal read out from normal pixels) and a signal to calculate the phase difference (a signal read out from phase differential pixels) from among the signals output from the image sensor 112 and sampled with AFE 113. The above process may quickly calculate the phase difference by using the signal to calculate the phase difference, and quickly perform the auto-focusing by generating images such as live view in parallel.

The image capturing apparatus 100 according to the above various exemplary embodiments may not be limited to auto-focusing technology using phase differential pixels. The image capturing apparatus 100 according to the various exemplary embodiments may further include a technical means to perform the contrast auto-focusing.

The image processor 140 may process raw image data, and convert the image data into YCbCr data. The raw image data may be compensated with compensating circuits (not illustrated) to compensate for pixel defects. The compensating circuits may compensate for the pixel defects by considering a compensation table, where the compensation table registers addresses of pixels having the defects. Compensating for the defects may be performed on pixels uniform to the addresses of surrounded pixels.

The image processor 140 may include optical black (OB) clamp circuits (not illustrated) determining black level of an image. The image sensor 112 includes an OB area; the black level may be determined through the differences between pixels by detecting signal average values on OB area.

Further, the image processor 140 may perform an adjustment for different sensitivity ratios per colors by using sensitivity ratio adjusting circuits (not illustrated). The sensitivity ratio adjusting circuits may adjust the sensitivity of red (R), green (G), and blue (B) colors under the standard optical source. Usually, a gain value of G may be fixed to be 1, and the sensitivity of R, B may be adjusted to the gain value of G.

When the still image is output, the image data may be output through an output buffer after the sensitivity is adjusted. In this case, because an image is generated with an interlaced method, the post-processing may not be performed immediately. However, because an image is generated with a progressive method when a live view image is outputted, the post-processing may be performed immediately.

Further, the image processor 140 may perform the read out of parts of pixel lines by using horizontal skip readout circuits (not illustrated), and perform the skip-read out regarding the other pixel lines. Thereby, the number of pixels in the raw image may be reduced.

The image processor 140 may adjust the white balance (WB) of the image data by using WB adjusting circuits (not illustrated). Because the spectrum distribution of the light is different according to the photographing environment, a white object may not be captured as being white. The signal level may be adjusted by providing different gain values respectively to the R, G, and B pixels. Usually, a gain value of G may be fixed to be 1, and the signal level of R, B may be adjusted to the gain value of G.

Further, the image processor 140 may perform a gamma compensation regarding the image data. Through gamma compensating, a grey scale conversion may be performed to correct the output of the image on display 190.

Further, the image processor 140 may generate usual color image signals including three colors per one pixel from Bayer signals including one color per one pixel by using color interpolating circuits (not illustrated).

Further, color-converting/color-compensating circuits (not illustrated) may convert the color dimension correctly to the outputting and compensate the colors. If necessary, a look up table (LUT) may be used. The image data may be YCbCr data after performing the color-converting/color-compensating.

The image processor 140 may adjust the image size by converting the resolution with resolution converting circuits (not illustrated).

The image processor 140 may process the dimension filter regarding the image data by using dimension filter circuits (not illustrated). Edge highlighting of Y signal may be performed, and low pass filter (LPF) of Cb/Cr signal may be processed.

Further, the image processor 140 may perform a skip-read out process on the Cb/Cr signal by using CbCr skip-read out circuits (not illustrated), and convert the image data to a YCbCr 4:2:2 format. The image data may be output through the output buffer, and recorded on the storage 160 through a bus connection.

Regarding a still image, the read out may be performed according to an interlaced method. In this case, color-interpolating may not be directly performed because neighboring pixel lines are not created. Thus, the still image may be stored in the progressive format on the storage 160 through the output buffer by adjusting the order of the pixel lines after the pre-processing completes. The stored image data may be read again and input to the image processor 140 through the input buffer.

However, the exemplary embodiments are not limited to the interlaced method of processing the still image; and other exemplary embodiments may be implemented to perform the read out for the still image using a progressive method.

Preview images or thumbnail images that show the photographing results in a smaller form than the photographed image may be needed. In this case, the preview images or the thumbnail images may be created by removing parts of pixel data such as by performing a skip-read out process.

The image processor 140 may interpolate phase differential pixels into the normal pixel values by using AF signal interpolating circuits (not illustrated). Because the phase differential pixels are arranged between the normal pixels, the resolution degradation may occur when the arranged phase differential pixels are used. Thus, the interpolating may be performed by using the surrounded normal pixels.

The phase differential pixel signals separated by separate circuits (not illustrated) may be recorded on the storage 160 through a bus connection. Because the read out and the separation may be performed with respect to all of the pixels, each phase differential pixel signal may be accumulated on the storage 160 for a short time.

The stored phase differential pixel signals may be input to phase differential calculation circuits (not illustrated) through a bus connection. The phase differential calculation circuits may calculate the phase difference between the phase differential pixels, and calculate a moving direction and moving amount of the focus lens. The calculated moving amount may be temporarily recorded on a register within the phase differential calculation circuits, and the controller 130 (i.e., CPU) may read the calculated moving amount.

A JPEG codec or other compression codec may be used to compress the YCbCr data. Further, the compressed image data may be recorded on the storage 160. The controller 130 may read the compressed image data recorded on the storage 160 and record the data on a memory card (not illustrated), which completes the image generating process.

The communicator 145 is configured to perform communication with another device. Specifically, the communicator 145 may perform communication with an external server (not illustrated). The communicator 145 may receive the information related with the still image from the external server, or trans-receive the image data. Further, the communicator 145 may perform the data trans-receiving between the first capturing apparatus 100-1 and the second capturing apparatus 100-2, which will be described below.

The communicator 145 may be implemented with various wireless communication technologies. The communicator 145 may include near field communication module to directly perform communication between devices without requiring a mediating device.

The communicator 145 may include at least one among Wi-Fi Direct communication module, Bluetooth module, Infrared data association module (IrDA), Near Field Communication (NFC) module, a Zigbee module, or other communication module.

Other communication technical means may be also implemented in communicator 145. For example, the communicator 145 may include any one among the cellular communication module, 3rd Generation (3G) mobile communication module, $4^{th}$ Generation (4G) mobile communication module, a Long Term Evolution (LTE) communication module, or other communication module.

The controller 130 may control general operation of the image capturing apparatus 100. Specifically, the controller 130 may control the above described operation regarding the target position setter 170, the tracker 180, the estimator 185, and the display 190. Further, operation of the other units may be directly and indirectly controlled by the controller 130.

The controller 130 may obtain the raw image data by controlling the photographer 110, and control the display 190 to display the live view images by controlling the image processor 140.

The controller 130 may include hardware architecture such as a CPU or cache memory, an operating system, and software architecture of applications for performing specific operations. Controlling commands regarding each unit of the image capturing apparatus 100 may be read into the memory according to the system clock, and each unit of the hardware may be operated by generating electric signals according to the read controlling commands.

The wired interface 150 may provide an interface with external devices. The wired interface 150 may be connected with external devices, which processes the trans-receiving of the image data or processes trans-receiving of firmware to perform a firmware upgrade.

The storage 160 may be used in storing the images or processing the images in connection with a CPU. An exemplary embodiment may use double data rate synchronous dynamic random-access memory (DDR SDRAM), which can enhance the output by twice as much compared to outputting using only from the upper end of a system clock signal by allowing outputting to be performed using the upper end and the lower end of the system clock signal.

When the storage 160 includes a flash memory (not illustrated), the storage 160 may store firmware programs, various pieces of adjusting information according to the specification of the image capturing apparatus 100, setting information according to a user input of the image capturing apparatus 100, and the photographed image files.

Further, when the memory card (not illustrated) is included, it may be removably attached to the image capturing apparatus 100. The memory card may store the photographed image files.

The input 125 is configured to receive a user input. The input 125 may include at least one button 126. Further, the input 125 may include the touch screen positioned on the display 190.

At least one button 126 may be formed on the front, the side, or the back of the housing of the image capturing apparatus 100 as a push type or a touch type button, and may include at least one of a power/lock-on button, a shutter button, a menu button, a home button, a back button, and a search button. When the button is pushed or activated, a corresponding control command may be generated and transmitted to the controller 130. The controller 130 may control operation of the image capturing apparatus 100 according to the corresponding controlling command to the button.

The image capturing apparatus 100 may further include a power supply (not illustrated) and an interface (not illustrated) to connect with external devices. Further, the image capturing apparatus 100 may include the position detector 175. The position detector 175 may detect the geographical location of the image capturing apparatus 100 by using a position sensor. The position detector 175 may include at least one of a global positioning system (GPS) sensor and an angular speed sensor.

Figure 10:
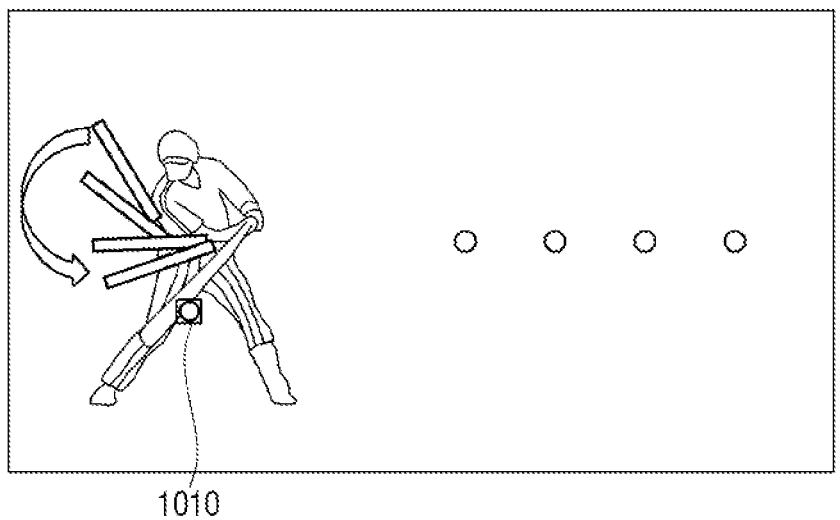
FIG. 10 illustrates a focusing method according to an exemplary embodiment.

FIG. 10 illustrates a focusing method according to an exemplary embodiment.

The image capturing apparatus 100 according to an exemplary embodiment may photograph a still image when the moving object is positioned on the target position, i.e., when the moving object is shot. Herein, the focus 1010 may be adjusted to focus on the moving object. Because it takes time to adjust the focus by moving the focus lens, the time for movement of the focus lens should be estimated. The controller 130 of the image capturing apparatus 100 according to an exemplary embodiment may estimate focus values at the estimated time for capturing the image by using the driving information of the motor driver 115 while displaying the live view images. The controller 130 may store and manage the position information of the focus lens according to the position of the moving object, and send a driving signal to the motor driver 115 according to the position information of the focus lens at the estimated position of the moving object. Herein, the moving object may be a bat or a ball as described in FIG. 10. The focus 1010 may be adjusted at the point where the batter will hit the ball.

Figure 11:
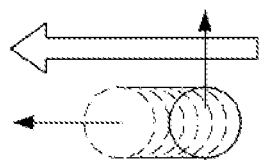
FIG. 11 illustrates Auto Focusing (AF) for focusing on a moving object according to an exemplary embodiment.

FIG. 11 illustrates Auto Focusing (AF) for focusing on the moving object.

When AF is performed by sensing the movement directions of a ball or a bat according to a calculation, there may be a problem with edge information of the object, such as blurring toward the direction of movement. Because the edge features of the object are kept toward the vertical direction of movement, AF may be calculated by providing a weight for pixel values toward the vertical direction. The lens focusing may be performed by using the phase differential AF method or the contrast AF method. With the contrast AF method, the contrast may be calculated toward the vertical direction of the movement of the object. With the phase differential AF method, AF may be calculated by providing a weight for phase differential pixels toward the vertical direction of the movement of the object.

When the actual speed of the moving object is slow relative to the frame rate (FPS) of the live view images, the movement information of the moving object may be difficult to be calculated. Further, because image capturing and calculating may be performed more than what is necessary, power may be consumed unnecessarily. However, when the actual speed of the moving object is fast relative to the frame rate, a problem may occur in which it is difficult to precisely capture the moment when the moving object is positioned on the target position.

Therefore, the controller 130 may adjust the frame rate of the image capturing apparatus based on information regarding intervals between the estimated trajectories of the moving object included in consecutive live view images. Thus, when the intervals between the estimated trajectories of the moving object included in the consecutive live view image frames are so small that the trajectories are overlapping each other, the controller 130 may decrease the frame rate. When the intervals between the estimated trajectories of the moving object are so large that it is difficult to precisely capture the moving object, the controller 130 may increase the frame rate. In other words, the estimator 185 may sense the speed of the moving object, and the display 190 may adjust the frame rate to a capturing speed in which the trajectories of the object do not overlap each other.

Figure 12:
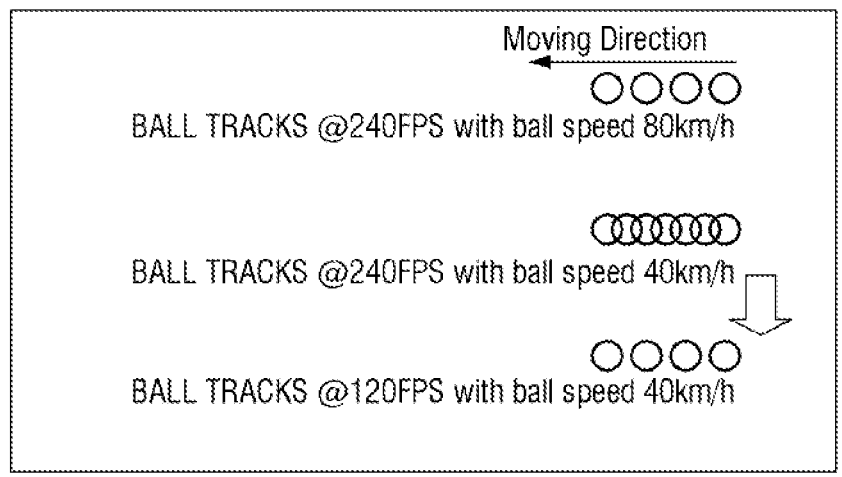
FIG. 12 illustrates a frame rate according to a speed of a ball which is a moving object according to an exemplary embodiment.

FIG. 12 illustrates the frame rate according to the speed of a ball which is a moving object according to an exemplary embodiment. Referring to FIG. 12, if the moving object has a speed of 80 km/h, the trajectories of the moving object do not overlap each other when the frame rate is 240 FPS. However, if the speed of the moving object decreases by half to 40 km/h and the same frame rate (240 FPS) is maintained, the trajectories of the moving object will overlap. In this case, the trajectories of the moving object will not overlap each other by decreasing the frame rate to 120 FPS.

Figure 13:
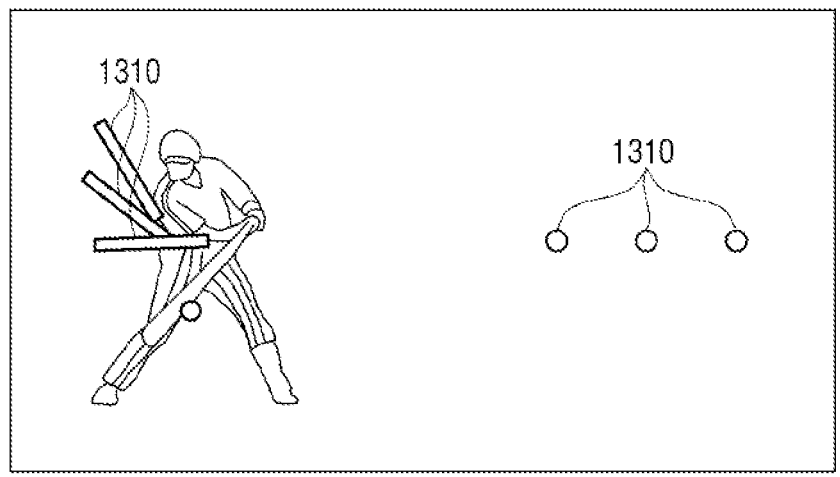
FIGS. 13 and 14 illustrate exemplary embodiments in which trajectories of a moving object are displayed on an image.
Figure 14:
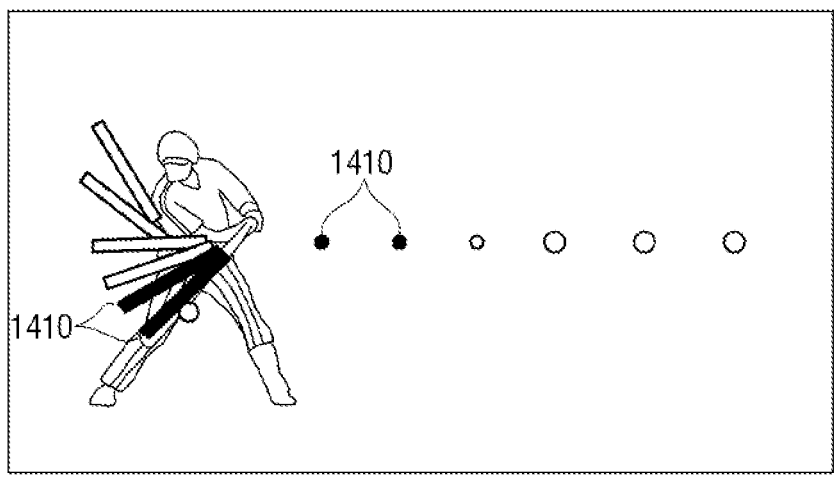

FIGS. 13 and 14 illustrate exemplary embodiments in which the trajectories of the moving object are displayed on the images.

Referring to FIG. 13, the track 1310 of the moving object may be displayed on the live view images. Thus, the detected position of a ball and a bat may be output on the screen while the live view images are displayed, as depicted in FIG. 13.

The above trajectories of the moving object may be displayed on the still image. Thus, the controller 130 may store the detected positions of a ball and a bat as metadata of the still image or as other data. The controller 130 may control the display 190 to display the moving trajectories of a bat with the moving trajectories of the moving object when reproducing the still image. Further, the above information may be displayed on the moving screen.

A related camera apparatus may complete displaying the live view images before the still image is captured after the live view images are displayed, display the black image (the still image may be generated while the black image is displayed), and may not display any information. When the generation of the still image completes, the captured still image is displayed.

The image capturing apparatus 100 according to an exemplary embodiment may display a new image that can substituted for the black image. The new image may be displayed on the screen after displaying the live view images completes, and indicates image marking the trajectories of the moving object described above on the final frame of the photographed live view images. Usually, the live view images may be generated by performing the read out on parts of the pixels in the image sensor, and the still image may be generated by performing the read out on more pixels than used for the live view images. The new image may be quickly displayed after displaying the live view images completes. Thus, the new image may be generated by performing the read out on the image pixels with a similar method to generating the live view images. Further, trajectories after capturing the still image completes (i.e., trajectories from the time when capturing the still image starts to the time when the moving object is positioned on the target position) may be estimated and displayed as well as trajectories of the moving object until the still image is captured. Regarding FIG. 13, the trajectories of the moving object may be displayed until the time when the still image is captured. Regarding FIG. 14, the trajectories of the moving object even after the time when the still image is captured to the time when the moving object is positioned on the target position may be estimated and displayed on the images. The trajectories of FIG. 14 may be processed so as to be displayed as a shadow. According to the above method, the black image may be substituted with the natural new image.

Further, the controller 130 may provide various special effects to the still image when the moving object is positioned on the target position.

FIGS. 15A, 15B, 16A and 16B are diagrams provided to explain special effects according to various exemplary embodiments.

Figure 15:
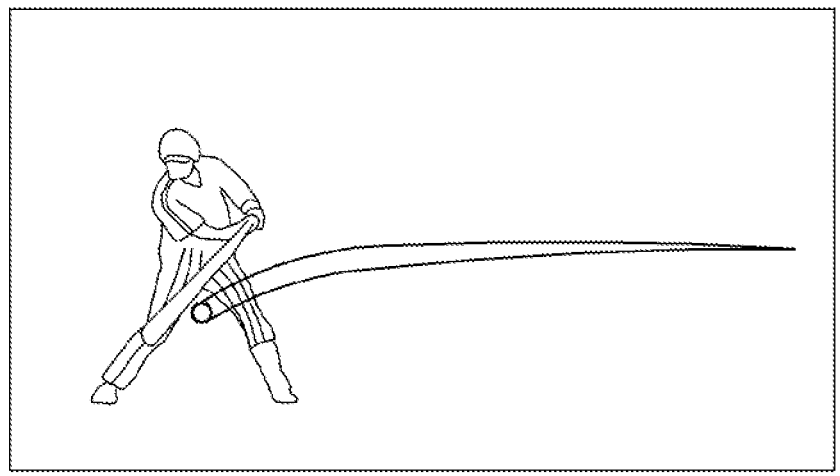
FIGS. 15A, 15B, 16A and 16B are diagrams provided to explain special effects according to exemplary embodiments.
Figure 15:
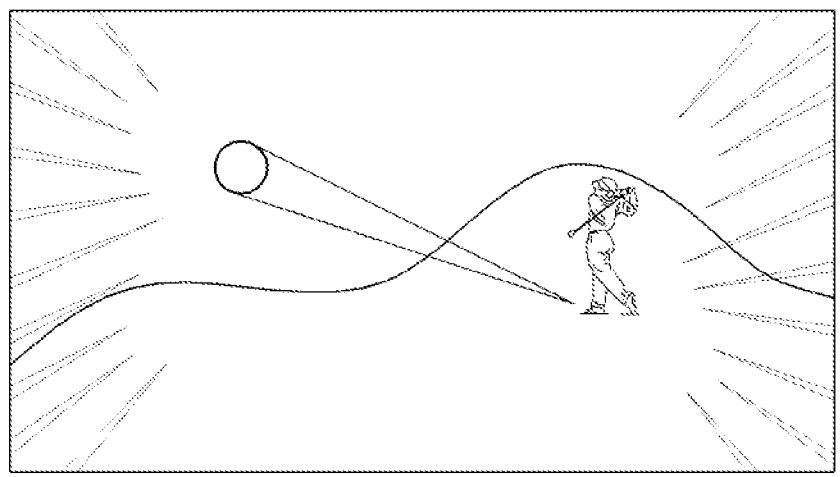

Referring to FIGS. 15A and 15B, after images or special effects may be provided by tracking the trajectories of the moving object. The exemplary embodiment of FIG. 15A illustrates providing special effects that mark the trajectories of a ball, which is a moving object. The exemplary embodiment of FIG. 15B illustrates applying special effects to the trajectories of a flying ball when a golfer hits the golf ball with a full swing.

Figure 16:
Figure 16:
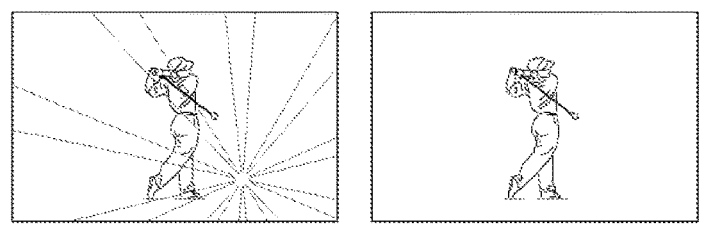

FIGS. 16A and 16B illustrate special effects indicating that the picture is photographed by highlighting the whole image at the moment when the still image is captured. Referring to FIG. 16A, a highlight indicating that the image is captured at the moment when a batter hits a ball may be marked, and the final captured still image may be displayed after a while. Referring to FIG. 16B, a highlight indicating that the image is captured at the moment when a golfer hits a golf ball may be applied to the whole image, and the final captured image may be displayed after a while.

Although the above exemplary embodiments provide examples of highlights applied to an image, the special effects are not be limited to such examples. For example, special effects may include various effects such as blurring processes or color modifying.

Figure 17:
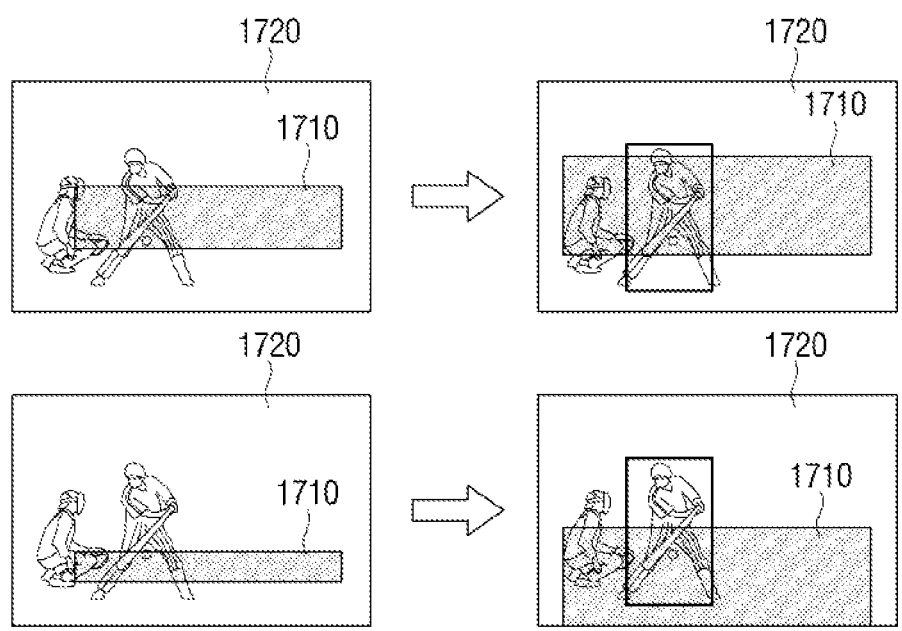
FIG. 17 illustrates an exemplary embodiment in which a read out is performed by differentiating the frame rate per area of a live view image.

FIG. 17 illustrates an exemplary embodiment in which the read out is performed by differentiating the frame rate per area of the live view images.

The image capturing apparatus 100 according to an exemplary embodiment sets the frame rate to a high speed because the moving object needs to be tracked. However, when the high speed frame rate is applied and the whole image sensor 112 is used, power consumption may increase. Further, because parts of the image pixels have to be read out in order to process the image at the high speed, resolution degradation may occur. Thus, the photographer 110 of the image capturing apparatus 100 according to an exemplary embodiment may read out the image sensor values by differentiating the frame rate per area of the live view images. For the above, a CMOS sensor may be used as the image sensor.

As illustrated in FIG. 17, the image pixel values may be read out at high speed for the area 1710 where the moving object (e.g., the bat and ball) is tracked, and the image pixel values may be read out at low speed for the other area 1720 of the image. The above areas may be processed differently according to the estimated trajectories of the moving object. The upper and the lower diagrams of FIG. 17 illustrate the difference in processing at the high speed and the low speed.

Figure 18:
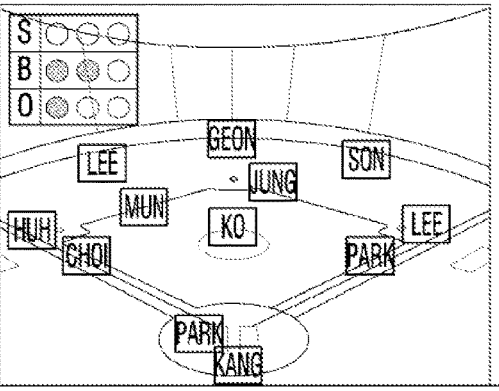
FIG. 18 illustrates a metadata creating method according to an exemplary embodiment.

FIG. 18 illustrates a method creating the metadata according to an exemplary embodiment.

The controller 130 of the image capturing apparatus 100 may create the metadata while generating the final still image. Herein, the controller 130 may receive the information related to the final still image from an external server (not illustrated) through the communicator 145. Further, the controller 130 may create the metadata regarding the still image based on the received information that is related to the still image. The metadata may be stored on the storage 160.

FIG. 18 describes an exemplary embodiment in which the metadata of the final still image is created by receiving batting information and game information of the batter from the external server. Herein, the photographing environment set information of the image capturing apparatus 100 such as photographing date or ISO numbers may be stored as metadata. The external server may be a game live broadcasting server.

Figure 19:
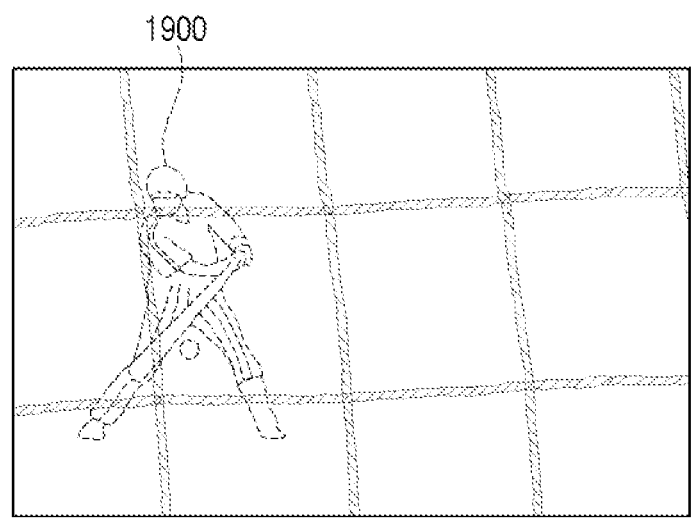
FIGS. 19 and 20 are diagrams provided to explain an object focusing technology according to an exemplary embodiment.
Figure 20:
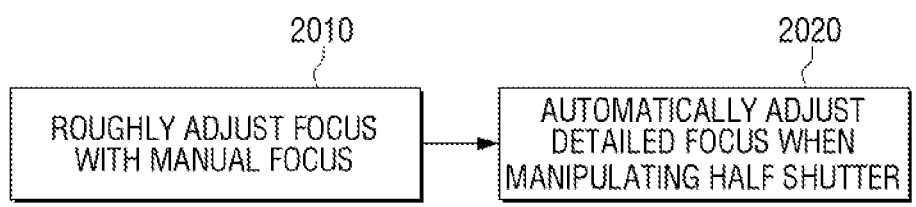

FIGS. 19 and 20 are diagrams provided to explain the object focusing technology according to an embodiment.

As illustrated in FIG. 19, when there is an obstacle such as a net between the image capturing apparatus 100 and the object 1900, it is usually difficult to adjust the focus on the object in the auto focus environment because the focus is first adjusted on the net which is a neighboring object. However, when manual focusing function is used, the focus may be adjusted on the object behind the net. However, the preciseness of the focusing may deteriorate in manual focusing.

In order to solve the above problem, the image capturing apparatus 100 according to an exemplary embodiment may provide a semi-manual focusing function. As described above, the image capturing apparatus 100 may include the focus lens (not illustrated) and the motor driver 115.

The image capturing apparatus 100 may set the focus range to be within preset range when a user roughly adjusts the focus at S2010 with the manual focusing function. Thus, when a manual focusing input is received by the image capturing apparatus 100, the controller 130 may limit the focus range of the focus lens to be within a preset range. When a half-shutter input is received by the image capturing apparatus 100, the controller 130 may control the motor driver 115 to perform an auto focus within the preset range at S2020. Thus, the focus may be correctly adjusted on the object.

Also, as described above, the image capturing apparatus 100 estimates the photographing time point to directly capture the still image. However, the above processes may be performed by using a plurality of the image capturing apparatuses. The following will further explain using a plurality of the image capturing apparatuses.

Figure 21:
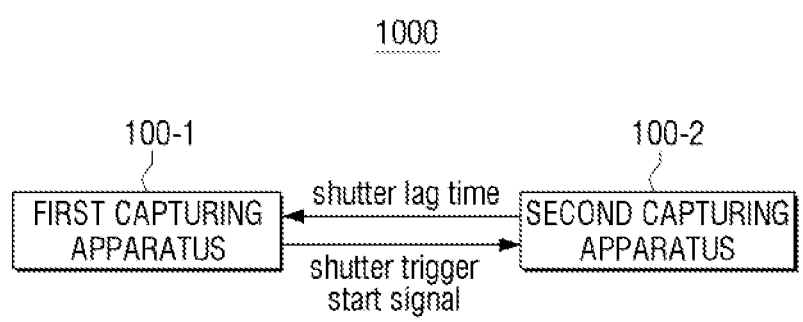
FIG. 21 is a block diagram of an image capturing system according to an exemplary embodiment.

FIG. 21 is a block diagram describing an image capturing system 1000 according to an exemplary embodiment.

Referring to FIG. 21, the image capturing system 1000 according to an exemplary embodiment includes the first capturing apparatus 100-1 and the second capturing apparatus 100-2. The first capturing apparatus 100-1, which is device that estimates the capturing time point of the still image, may receive the shutter lag time information from the second capturing apparatus 100-2. Further, the first capturing apparatus 100-1 may generate a shutter trigger start signal and transmit it to the second capturing apparatus 100-2.

The shutter lag time information indicates information regarding the amount of time until the read out of the pixel data is performed after a shutter release is performed. Regarding the moving object, the position may be modified on the live view images until the read out of the pixel data is performed after a shutter release is performed. Thus, a shutter release needs to be performed at the moment before the estimated time when the moving object is positioned on the target position. Herein, the shutter lag time information may be considered for the time when a shutter release is performed. Regarding the exemplary embodiment in which the still image is captured at the moment when the batter hits a ball, the time when a ball is hit may be estimated, and a shutter signal corresponding to the shutter release may be generated to account for the shutter lag time from the estimated time. Because the shutter lag time information may vary for different types of image capturing apparatuses, the second capturing apparatus 100-2 may provide the above information to the first capturing apparatus 100-1.

The first capturing apparatus 100-1 may generate a starting signal of a shutter release trigger by considering the received shutter lag time information. A user may manipulate the shutter of the first capturing apparatus 100-1 or the second capturing apparatus 100-2 to provide a sufficient time before capturing the still image. The second capturing apparatus 100-2 may transmit the shutter lag time information to the first capturing apparatus 100-1, and the first capturing apparatus 100-1 may provide the shutter release trigger starting signal to the second capturing apparatus 100-2 by estimating the time when the moving object is positioned on the target position with the method described above. The shutter release trigger starting signal includes information regarding the time when the second capturing apparatus 100-2 generates the shutter signal. The second capturing apparatus 100-2 may count the time; when it is the time to generate the shutter signal, the shutter signal may be generated and the still image may be captured.

The following will explain an image capturing method according to various embodiments.

Figure 22:
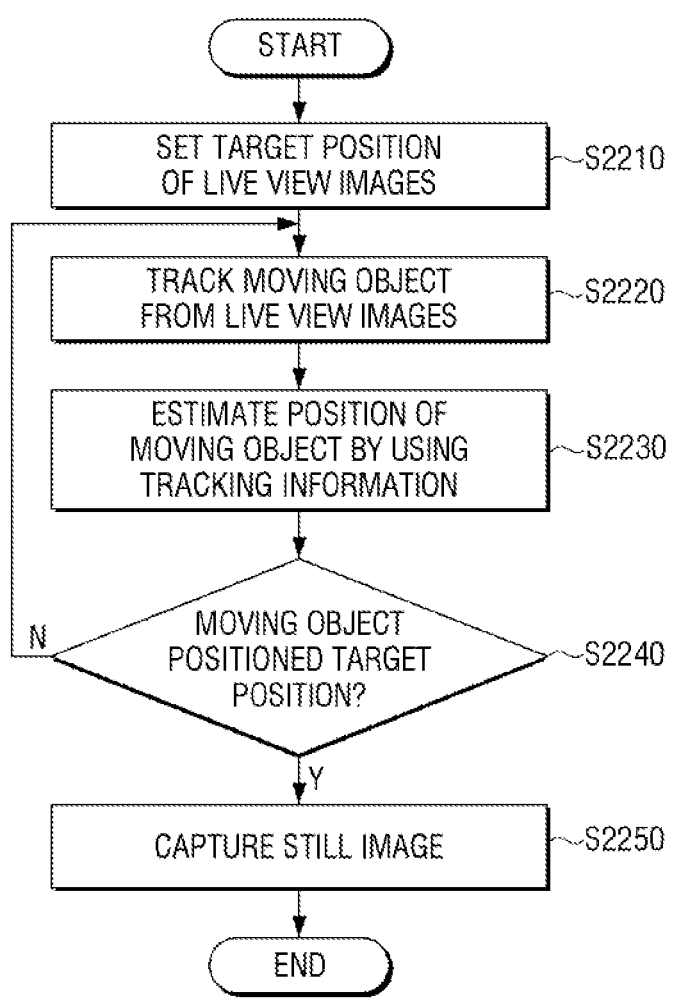
FIG. 22 is a flowchart provided to explain an image capturing method according to an exemplary embodiment.

FIG. 22 is a flowchart provided to explain an image capturing method according to an exemplary embodiment.

Referring to FIG. 22, the image capturing method according to an exemplary embodiment includes setting the target position of the live view images at S2210, tracking the moving object from the live view images at S2220, estimating the position of the moving object by using the above tracked information at S2230, and capturing the still image based on the estimated results at S2250 when the moving object is positioned on the target position of the live view images at S2240-Y.

Herein, setting the target position may set the target position based on the detected object by detecting the preset object on the live view images.

Further, setting the target position may include setting the position according to a user input as target position.

Further, setting the target position may include setting the target position based on the position information detected by the image capturing apparatus.

Further, the image capturing method may include displaying the guide line indicating the target position.

Further, the image capturing method may include identifying a person included in the live view images, and may display the guide line indicating the target position based on the information corresponding to the identified person.

Further, identifying a person may include identifying the person by recognizing the person's face, jersey number, or other information on the player included in the live view images.

Herein, the information corresponding to the identified person may be at least one among the batting average or the batting points of the runner. Further, setting the target position may set the target position again by reversing the target position based on the vertical direction when a user command to reverse the target position is received. Further, the image capturing method may include displaying the guide box indicating the target position, and performing a zoom-in or zoom-out on the lens of the image capturing apparatus so that the person included in the live view images fills the guide box.

Further, the size of the guide box may be adjusted according to a drag input from a user.

Further, tracking the moving object may track the moving object by using at least one among the actual size of the moving object, the size of the moving object in the live view images, the displacement of the moving object in the previously photographed live view images, and the frame rate of the image capturing apparatus.

Further, the image capturing method may include inserting the speed information of the moving object into the captured still image, and the speed information of the moving object may be calculated according to the following mathematical formula.

Speed of Moving Object (km/h)=Actual Diameter (mm) of Moving Object/Measured Diameter (pixel) of Moving Object*Position Displacement (pixel) of Moving Object between Image Frames*Photographing Speed (frame/sec) of Image Frame*3600/1000/1000.

Further, the image capturing method may include calculating the hitting position regarding the moving object and displaying the calculated hitting position on the screen. The hitting position may be calculated according to the following mathematical formula.

Hitting position (pixel)=Speed of Moving Object (km/h) *1000*1000/3600*1/Photographing Speed (sec/frame) of Image Frame*Height_pixel (pixel)/Height_guide_box (meter)*Minimum Taken Time (frame). Herein, Height_pixel indicates measured height of the guide box included in the live view and Height_guide_box indicates actual height of the guide box included in the live view. Further, the still image may be captured by adjusting the focus of the image capturing apparatus on the moving object.

Further, the focus of the image capturing apparatus may be adjusted by providing a weight on the contrast toward the vertical direction of the direction of movement of the object or on the phase differential pixel values.

The image capturing method may include displaying the trajectories of the moving object on the captured still image. Further, the image capturing method may include receiving the information related to the still image from the server, and creating the metadata of the still image based on the received information related to the still image. Further, the image capturing method may include determining the time necessary for the moving object to be positioned on the target position based on the estimated results, and displaying a warning message when the determined time is shorter than the shutter lag time of the image capturing apparatus. Further, the image capturing method may include adjusting the frame rate of the image capturing apparatus based on information regarding the intervals between the estimated trajectories regarding the moving object included in the consecutive live view images.

The image capturing method may be embodied in a program form on non-transitory computer readable recording medium and executed by a computer or processor. Herein, non-transitory computer readable recording medium refers to a medium which stores data semi-permanently and can be read by devices, not a medium storing data temporarily such as register, cache, or memory. For example, a compact disc (CD), digital versatile disc (DVD), hard disk, Blu-ray disk, a universal serial bus (USB) storage, a memory card, or read only memory (ROM) may be non-transitory computer readable recording medium.

Further, the image capturing method may be embodied in software form such as a field-programmable gate array (FPGA), which is stored on a hardware integrated circuit (IC) chip and provided. Further, the image capturing method may be included as one unit of the image capturing apparatus 100, 100-1, 100-2.

Further, the foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not limiting.

What is claimed is:

1. An image capturing method of an image capturing apparatus comprising:
   obtaining geographical position information of the image capturing apparatus;
   detecting a predefined object from a live view image;
   recognizing, in the view image, external features or characteristics of the detected predefined object;
   identifying identification information of the detected predefined object from among identification information of a plurality of objects stored in the image capturing apparatus based on the recognized external features or characteristics;
   setting a target position in the live view image based on a moving object from the live view image, the geographical position information, and the identification information of the detected predefined object, the moving object being different from the detected predefined object;
   tracking the moving object from the live view image;
   estimating a position of the moving object after a certain period of time in the future by using information on the tracked moving object; and
   capturing a still image based on the estimated position when the moving object is positioned on the target position in the live view image.

2. The image capturing method of claim 1, wherein the setting the target position comprises, after obtaining an image capturing direction of the image capturing apparatus based on a shape deformation of the detected predefined object, setting the target position based on the image capturing direction.

3. The image capturing method of claim 1, wherein the setting the target position comprises setting the target position according to a user input to be the target position.

4. The image capturing method of claim 1, further comprising:
   displaying a guide line indicating the target position.

5. The image capturing method of claim 4, further comprising:
   identifying a person included in the live view image,
   wherein the guide line indicating the target position is displayed based on information corresponding to the identified person.

6. The image capturing method of claim 5, wherein the identifying the person included in the live view image comprises identifying the person by recognizing a face or number of the person included in the live view image.

7. The image capturing method of claim 5, wherein the information corresponding to the identified person is at least one of a batting average and batting points of the identified person.

8. The image capturing method of claim 1, wherein the setting the target position of the live view image comprises setting the target position again by reversing the target position based on a vertical line passing through a center of the live view image, in response to receiving a user command to reverse the target position.

9. The image capturing method of claim 1, further comprising:
   displaying a guide box; and
   performing a zoom-in or a zoom-out of a lens of the image capturing apparatus to fill up the guide box with a person included in the live view image.

10. The image capturing method of claim 9, further comprising adjusting a size of the displayed guide box according to an input of a user.

11. The image capturing method of claim 1, wherein the estimating the position of the moving object from the live view image comprises estimating the position of the moving object by using at least one of an actual size of the moving object, a size of the moving object on the live view image, a displacement of the moving object relative to a previously photographed live view image, and a frame rate of the image capturing apparatus.

12. The image capturing method of claim 1, further comprising:
   determining a time necessary for the moving object to be positioned on the target position based on the estimated position; and displaying a warning message when the determined time is less than a shutter lag time of the image capturing apparatus.

13. The image capturing method of claim 1, further comprising:
adjusting a frame rate of the image capturing apparatus based on information regarding intervals between estimated trajectories of the tracked moving object included in consecutive live view image frames.

14. The image capturing method of claim 1, wherein the still image is captured by adjusting a focus of the image capturing apparatus on the moving object.

15. The image capturing method of claim 14, wherein the focus of the image capturing apparatus is adjusted by providing a weight on a contrast toward a vertical direction to a moving direction of the moving object or on phase differential pixel values.

16. The image capturing method of claim 1, further comprising:
displaying estimated trajectories of the tracked moving object on the captured still image.

17. The image capturing method of claim 1, further comprising:
receiving information related to the still image from a server; and
creating metadata regarding the still image based on the received information related to the still image.

18. The image capturing method of claim 1, wherein the certain period of time comprises a lag time for capturing image after a capture decision is made, such as a shutter lag and/or a sensor exposure time.

19. The image capturing method of claim 1, wherein the setting the target position comprises setting the target position relative to a position of the detected predefined object.

20. The image capturing method of claim 1, wherein the geographical position information obtained by the image capturing apparatus comprises GPS information.

21. The image capturing method of claim 1, wherein the predefined object is a person, and
wherein the identification information includes information identifying the person.

22. The image capturing method of claim 21, wherein the recognized external features or characteristics include a face or a number of the person.

23. The image capturing method of claim 21, wherein the identification information further includes at least one of a batting average and batting points of the identified person.

24. The image capturing method of claim 1, wherein the target position is preset relative to the predefined object, and
wherein the setting the target position comprises adjusting the preset target position based on the identification information of the predefined object.

25. An image capturing apparatus comprising:
a storage;
a display configured to display a live view image;
a position detector configured to obtain geographical position information of the image capturing apparatus;
a target position setter configured to:
detect a predefined object from the live view image,
recognize, in the live view image, external features or characteristics of the detected predefined object,
identify identification information of the detected predefined object from among identification information of a plurality of objects stored in the storage based on the recognized external features or characteristics, and
set a target position of the live view image based on a moving object from the live view image, the geographical position information of the image capturing apparatus obtained by the position detector, and the identification information of the detected predefined object, the moving object being different from the detected predefined object;
a tracker configured to track the moving object from the live view image;
an estimator configured to estimate a position of the moving object by using information on the tracked moving object; and
a photographing device configured to capture a still image based on the estimated position when the moving object is positioned on the target position of the live view image.

26. The image capturing apparatus of claim 25, further comprising:
a focus lens;
a motor driver configured to drive the focus lens; and
a controller configured to control the motor driver to adjust focus with the focus lens,
wherein the controller is further configured to limit a focus range of the focus lens to be within a preset range in response to receiving a manual focusing input, and to control the motor driver to perform auto focusing within the preset range in response to receiving a half shutter input.

* * * * *